(12) United States Patent
Uetake et al.

(10) Patent No.: US 12,312,480 B2
(45) Date of Patent: May 27, 2025

(54) AQUEOUS INK, INK CARTRIDGE AND INK JET RECORDING METHOD

(71) Applicant: CANON KABUSHIKI KAISHA, Tokyo (JP)

(72) Inventors: Yoko Uetake, Kanagawa (JP); Akemi Watanabe, Kanagawa (JP); Yoshio Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 17/720,352

(22) Filed: Apr. 14, 2022

(65) Prior Publication Data
US 2022/0332964 A1 Oct. 20, 2022

(30) Foreign Application Priority Data

| Apr. 20, 2021 | (JP) | 2021-071263 |
| Apr. 20, 2021 | (JP) | 2021-071264 |
| Apr. 20, 2021 | (JP) | 2021-071265 |
| Mar. 22, 2022 | (JP) | 2022-045793 |

(51) Int. Cl.
*C09D 11/322* (2014.01)
*B41J 2/01* (2006.01)
(Continued)

(52) U.S. Cl.
CPC .............. *C09D 11/322* (2013.01); *B41J 2/01* (2013.01); *B41J 2/17503* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201;
(Continued)

(56) References Cited

U.S. PATENT DOCUMENTS

| 6,074,052 A | 6/2000 | Inui et al. |
| 7,291,211 B2 | 11/2007 | Kaneko et al. |

(Continued)

FOREIGN PATENT DOCUMENTS

| JP | H06-306316 A | 11/1994 |
| JP | 2006-045450 A | 2/2006 |

(Continued)

*Primary Examiner* — Manish S Shah
(74) *Attorney, Agent, or Firm* — Venable LLP

(57) ABSTRACT

Provided is an aqueous ink that has excellent ejection stability and that can be used to record an image with excellent abrasion resistance and an ink cartridge and an ink jet recording method that use the aqueous ink. The aqueous ink is an aqueous ink for ink jet containing a pigment, an organic solvent and a resin particle formed of a polyester resin or a urethane resin. The organic solvent includes a carbonate compound and the like. The ink cartridge includes an ink container configured to contain the aqueous ink and the ink jet recording method records an image on a recording medium by ejecting the aqueous ink from an ink jet recording head.

22 Claims, 3 Drawing Sheets

(51) Int. Cl.
*B41J 2/175* (2006.01)
*B41J 2/21* (2006.01)
*B41M 5/00* (2006.01)
*C09D 11/102* (2014.01)
*C09D 11/104* (2014.01)
*C09D 11/38* (2014.01)

(52) U.S. Cl.
CPC ....... *B41J 2/17513* (2013.01); *B41J 2/17553* (2013.01); *B41J 2/2107* (2013.01); *B41M 5/0023* (2013.01); *C09D 11/102* (2013.01); *C09D 11/104* (2013.01); *C09D 11/38* (2013.01)

(58) Field of Classification Search
CPC ...... B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 3/4078; B41J 11/0021; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227; B41F 23/042; B41F 23/0436

See application file for complete search history.

(56) References Cited

U.S. PATENT DOCUMENTS

| | | | |
|---|---|---|---|
| 7,291,214 | B2 | 11/2007 | Tsuji et al. |
| 7,297,202 | B2 | 11/2007 | Ichinose et al. |
| 7,578,876 | B2 | 8/2009 | Nakajima et al. |
| 8,425,027 | B2 | 4/2013 | Nishiwaki et al. |
| 8,602,546 | B2 | 12/2013 | Shimizu et al. |
| 8,602,547 | B2 | 12/2013 | Nakata et al. |
| 8,834,621 | B2 | 9/2014 | Takebayashi et al. |
| 8,987,348 | B2 | 3/2015 | Mukae et al. |
| 11,072,720 | B2 | 7/2021 | Furuse et al. |
| 2004/0244622 | A1 | 12/2004 | Ichinose et al. |
| 2005/0043434 | A1 | 2/2005 | Ichinose et al. |
| 2006/0130706 | A1 | 6/2006 | Nakajima et al. |
| 2006/0135647 | A1* | 6/2006 | Ichinose ............... C09D 11/326 523/160 |
| 2006/0142416 | A1 | 6/2006 | Sakai et al. |
| 2006/0167136 | A1 | 7/2006 | Kaneko et al. |
| 2014/0065381 | A1* | 3/2014 | De Saint Romain .. C09D 11/30 347/100 |
| 2014/0378585 | A1* | 12/2014 | Li ........................ C09D 11/328 524/90 |
| 2015/0050467 | A1* | 2/2015 | Nakagawa ........... C09D 11/102 347/100 |
| 2015/0155105 | A1* | 6/2015 | Fukui ................... H01G 9/0036 438/82 |
| 2018/0244615 | A1* | 8/2018 | Schmitt ................ C07D 207/27 |
| 2022/0186058 | A1 | 6/2022 | Uetake et al. |

FOREIGN PATENT DOCUMENTS

| | | |
|---|---|---|
| JP | 2008-183843 A | 8/2008 |
| JP | 2008-230160 A | 10/2008 |
| JP | 2009-102480 A | 5/2009 |
| JP | 2018-058972 A | 4/2018 |

\* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

A pigment ink containing a pigment as a coloring material is increasingly used in an ink jet recording method from a viewpoint of fastness of an image. However, in the image recorded by using the pigment ink, the coloring material is a particle and this has a problem of low abrasion resistance. Moreover, not only a recording medium with good ink absorptivity such as conventional general-purpose plain paper and ink jet paper but also a recording medium with poor ink absorptivity such as coated paper for recording are increasingly used as a recording medium on which an image are to be recorded by the ink jet recording method. In the recording medium with poor ink absorptivity, the abrasion resistance of an image tends to low. Accordingly, there is a demand for improving the abrasion resistance without depending on the ink absorptivity of the recording medium.

Studies for improving the fixing property and abrasion resistance of an image recorded with the pigment ink have been made. For example, there is proposed an image forming method in which an image recorded with an ink containing a resin component is coated with a liquid containing a solvent that dissolves or softens the resin component (Japanese Patent Application Laid-Open No. 2008-183843). Moreover, there is proposed an ink that contains a coloring material and a urethane resin at a predetermined ratio and in which the urethane resin can cover the coloring material of an image formed on a recording medium to some extent (Japanese Patent Application Laid-Open No. 2018-058972).

When a coating liquid as described in Japanese Patent Application Laid-Open No. 2008-183843 is used, means for applying the coating liquid to the recording medium needs to be provided. Moreover, although the ink described in Japanese Patent Application Laid-Open No. 2018-058972 can achieve a certain level of abrasion resistance of an image, the ejection stability tends to become poor when a large-size image is recorded or images are continuously recorded. Accordingly, the present inventors studied modification of an ink composition to achieve stable recording of an image with abrasion resistance higher than that in the conventional technique without using a coating liquid or the like.

Thus, an object of the present invention is to provide an aqueous ink that has excellent ejection stability and that can be used to record an image with excellent abrasion resistance. Moreover, another object of the present invention is to provide an ink cartridge and an ink jet recording method that use the aqueous ink.

SUMMARY OF THE INVENTION

Specifically, the present invention provides an aqueous ink for ink jet comprising: a pigment; a resin particle; and an organic solvent, wherein the resin particle is a first resin particle formed of a polyester resin and the organic solvent is at least one selected from the group consisting of a compound represented by a general formula (1), a compound represented by a general formula (2) and a compound represented by a general formula (3).

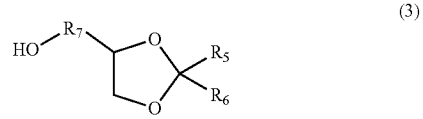

(In the general formula (1), $R_1$ and $R_2$ each independently represent a linear or branched alkyl group with one to six carbon atoms. In the general formula (2), $R_3$ represents an ethylene group or a propylene group, $R_4$ represents a methyl group or an ethyl group, n represents 0 or 1 and n is 1 when $R_3$ is the ethylene group. In the general formula (3), $R_5$ and $R_6$ each independently represent a linear or branched alkyl group with one to four carbon atoms and $R_7$ represents an alkylene group with one to four carbon atoms.)

Moreover, the present invention provides an aqueous ink for ink jet comprising: a pigment; a resin particle; and an organic solvent, wherein the resin particle is a second resin particle formed of a urethane resin and the organic solvent is at least one selected from the group consisting of a compound represented by a general formula (1) and a compound represented by a general formula (2).

(In the general formula (1), $R_1$ and $R_2$ each independently represent a linear or branched alkyl group with one to six carbon atoms. In the general formula (2), $R_3$ represents an ethylene group or a propylene group, $R_4$ represents a methyl group or an ethyl group, n represents 0 or 1 and n is 1 when $R_3$ is the ethylene group.)

Further features of the present invention will become apparent from the following description of exemplary embodiments with reference to the attached drawings.

BRIEF DESCRIPTION OF THE DRAWINGS

FIG. 2A is a perspective view of a main portion of the ink jet recording apparatus and FIG. 2B is a perspective view of a head cartridge.

DESCRIPTION OF THE EMBODIMENTS

Figure 1:
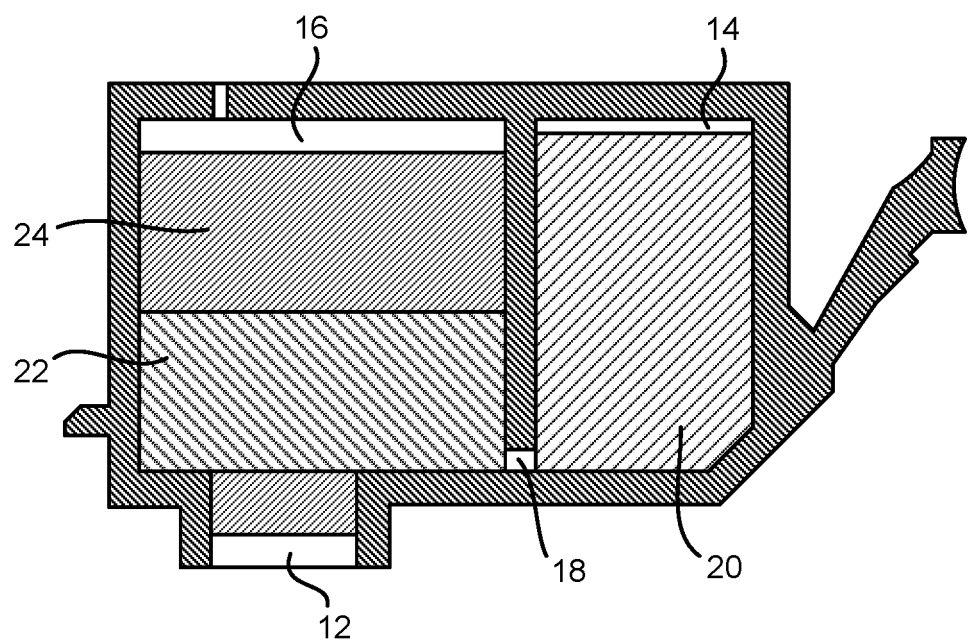
FIG. 1 is a cross-sectional diagram schematically illustrating an embodiment of an ink cartridge in the present invention.

The present invention is described below in further details while giving an example of a preferable embodiment. In the present invention, when a compound is a salt, the compound is present in an ink while being dissociated as ions but an expression of "contains a salt" is used for the sake of convenience. Moreover, an aqueous ink for ink jet is simply referred to as "ink" in some cases. Physical property values are values at normal temperature (25° C.), normal pressure (one atmosphere=101,325 Pa) and normal humidity (relative humidity of 50%) unless otherwise noted. A "unit" means a unit structure corresponding to one monomer unless otherwise noted. Description of "(meth)acrylic acid" and "(meth) acrylate" means "acrylic acid, methacrylic acid" and "acrylate, methacrylate", respectively.

The present inventors studied a configuration of a pigment ink that can achieve both of abrasion resistance of an image recorded with the ink and ejection stability of the ink at high levels. As a result, the inventors found that both of these properties can be achieved in a specific combination of a resin particle and an organic solvent described in the following (a) and (b) and came up with the present invention.

(a) A first resin particle formed of a polyester resin and at least one type of organic solvent selected from the group consisting of a compound represented by a general formula (1), a compound represented by a general formula (2) and a compound represented by a general formula (3) (first embodiment).

(b) A second resin particle formed of a urethane resin particle and at least one type of organic solvent selected from the group consisting of the compound represented by the general formula (1) and the compound represented by the general formula (2) (second embodiment).

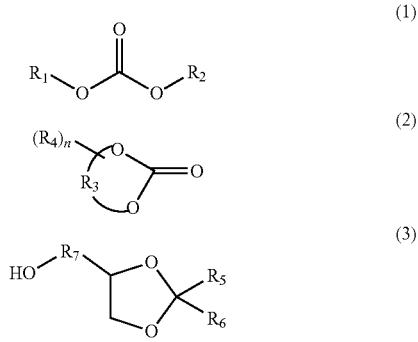

(In the general formula (1), $R_1$ and $R_2$ each independently represent a linear or branched alkyl group with one to six carbon atoms. In the general formula (2), $R_3$ represents an ethylene group or a propylene group, $R_4$ represents a methyl group or an ethyl group, n represents 0 or 1 and n is 1 when $R_3$ is the ethylene group. In the general formula (3), $R_5$ and $R_6$ each independently represent a linear or branched alkyl group with one to four carbon atoms and $R_7$ represents an alkylene group with one to four carbon atoms.)

The compound represented by the general formula (1) is a linear carbonate compound. The compound represented by the general formula (2) is a cyclic carbonate compound. Moreover, the compound represented by the general formula (3) is a dioxolane compound. These compounds all have relatively high hydrophobic properties among organic solvents used in the aqueous ink for ink jet and multiple oxygen atoms are present in the backbones thereof. Accordingly, these organic solvents tend to specifically interact with ester bond (—COO—) of the polyester resin forming the resin particle and urethane bond (—NH—COO—) of the urethane resin forming the resin particle.

In both of the first and second embodiments, a phenomenon as described below is assumed to occur in a recording medium by combining the aforementioned organic solvent with the resin having a form of particle (resin particle). Specifically, when the ink is ejected from a recording head and applied to the recording medium, water decreases due to evaporation or permeation into the recording medium and the concentration of the aforementioned specific organic solvent relatively increases. Then, the aforementioned organic solvent comes close to and interacts with the resin particle to soften the resin particle. The pigment is entangled in and held by a resin chain of the softened resin particle and is thereby fixed to the recording medium. The abrasion resistance of the image can be thus improved.

In a state where the amount of water has not decreased, presence of water suppresses the interaction between the resin particle and the organic solvent to a low level. Accordingly, the ejection stability can be improved also in a situation where the ink is continuously ejected. However, the second resin particle formed of the urethane resin strongly interacts with a hydroxy group of the compound represented by the general formula (3) also in the ink and the level of ejection stability is thus lower. Accordingly, at least one of the compound represented by the general formula (1) and the compound represented by the general formula (2) needs to be used as the organic solvent to be combined with the second resin particle.

<Aqueous Ink>

The ink of the present invention is an aqueous ink for ink jet that contains a pigment, a resin particle and an organic solvent. An ink of the first embodiment contains the pigment, the first resin particle formed of a polyester resin and at least one type of organic solvent selected from the group consisting of the compound represented by the general formula (1), the compound represented by the general formula (2) and the compound represented by the general formula (3). Meanwhile, an ink of the second embodiment contains the pigment, the second resin particle formed of a urethane resin and at least one type of organic solvent selected from the group consisting of the compound represented by the general formula (1) and the compound represented by the general formula (2). Moreover, the ink of the present invention does not have to be used in use application in which another liquid such as a coating liquid or a clear ink is applied after the ink is applied onto the recording medium or use application in which treatment with an activation energy beam, heat or the like is performed after the ink is applied onto the recording medium. Components forming the ink are described below.

(Pigment)

The ink contains the pigment. The dispersion method of the pigment may include a resin dispersed pigment dispersed with a resin dispersant, a pigment dispersed with a surfactant, a micro encapsulated pigment in which a particle surface of the pigment is at least partially coated with a resin or the like, and other similar pigments. Moreover, a self-dispersible pigment in which a functional group including a hydrophilic group such as an anionic group is bonded to the particle surface of the pigment, a pigment (resin bonded type self-dispersible pigment) in which an organic group including a polymer is chemically bonded to the particle surface of the pigment may also be used. Furthermore, pigments of different dispersion methods may be used in combination.

An inorganic pigment, an organic pigment or the like can be used as the pigment. Specific examples of the pigment include: inorganic pigments such as carbon black and titanium oxide; and organic pigments such as azo, phthalocyanine, quinacridone, isoindolinone, imidazolone, diketo-pyrrolo-pyrrole and dioxazine. The content (% by mass) of the pigment in the ink is preferably 0.1% by mass or more to 15.0% or less based on the total mass of the ink, more preferably 1.0% to 10.0% or less.

(Resin Particle)

The ink contains the first resin particle formed of a polyester resin or the second resin particle formed of a urethane resin. Although the first resin particle and the second resin particle can be used together, in such a case, it is preferable to use at least one of the compound represented by the general formula (1) and the compound represented by the general formula (2) and not the compound represented by the general formula (3) as the organic solvent. In the present description, the first resin particle and the second resin particle are sometimes collectively described below as "resin particle". The resin particle is present in the ink in a dispersed state, that is in a form of resin emulsion. Moreover, the resin particle is preferably a resin that contains no coloring material. Note that an active energy ray curable resin particle, that is a resin particle including a polymerizable group is also not so preferable.

The "resin particle" in the present description means a resin present in a liquid medium while forming a particle whose particle size is measurable when the resin is neutralized by a base 1.0 time (mol ratio) or more the acid value of the resin. The particle size of the resin is measured by dynamic light scattering. Meanwhile, a "water-soluble resin" in the present description means a resin present in a liquid medium while not forming a particle whose particle size is measurable when the resin is neutralized by a base 1.0 time (mol ratio) or more the acid value of the resin.

Whether a certain resin is the water-soluble resin or the resin particle (water-dispersible resin) can be determined according to the method described below. First, there is prepared a liquid (resin content: about 10% by mass) containing a resin neutralized by a base (sodium hydroxide, potassium hydroxide or the like) of an amount corresponding to the acid value or more. Next, the prepared liquid is diluted with pure water and a specimen with a resin content of about 1% by mass is prepared. Then, the particle size of the resin in the specimen is measured by dynamic light scattering. When no particle with a particle size is measured, the resin is determined to be the water-soluble resin. When a particle with a particle size is measured, the resin is determined to be the resin particle. Measurement conditions in this case can be set as, for example, Set Zero: 30 seconds, number of times of measurement: 3 and measurement time: 180 seconds. A particle size analyzer (for example, "UPA-EX150" manufactured by Nikkiso Co., Ltd.) using dynamic light scattering or the like can be used as a particle size distribution measurement apparatus. The used particle size distribution measurement apparatus, the measurement conditions and the like are not limited those described above as a matter of course.

[Content of Resin Particle]

The content (% by mass) of the resin particle in the ink is preferably 0.1% by mass or more to 20.0% or less based on the total mass of the ink. The content is more preferably 0.5% by mass or more to 10.0% or less, particularly preferably 0.5% or more to 5.0% or less. When the content of the resin particle in the ink is less than 0.5% by mass, the amount of the resin particle is small and the effect of improving the abrasion resistance of the image cannot be sufficiently obtained in some cases. Meanwhile, when the content of the resin particle is too large, the resin particle tends to interact with the organic solvent also in the ink and the effect of improving the ejection stability of the ink cannot be sufficiently obtained in some cases. Accordingly, the content of the resin particle is preferably set to 10% by mass or less, more preferably 5.0% or less.

[Particle Size of Resin Particle]

The volume-based cumulative 50% particle size ($D_{50}$) of the resin particle is preferably 30 nm or more to 300 nm or less. When $D_{50}$ of the resin particle is less than 30 nm, the resin particle tends to enter a gap in a pigment particle in the recording medium to which the ink is applied and the effect of improving the abrasion resistance may thus decrease. Meanwhile, when $D_{50}$ of the resin particle is more than 300 nm, given a fixed amount of the resin particle, the number of particles is relatively small and uneven distribution of the resin particle tends to occur in the recording medium to which the ink is applied. Thus, it is sometimes difficult to improve the abrasion resistance evenly over the entire image. The volume-based cumulative 50% particle size ($D_{50}$) of the resin particle can be measured by dynamic light scattering under the same conditions as those in the aforementioned method of determining whether "the resin is the resin particle or not".

[First Resin Particle Formed of Polyester Resin]

The ink of the first embodiment contains the first resin particle formed of a polyester resin. The proportion (% by mass) of the polyester resin in the resin forming the first resin particle is preferably 90.0% by mass or more based on the total mass of the resin particle and may be 100.0%. Specifically, the first resin particle is preferably formed substantially only of the polyester resin. A commercially-available resin may be used as the polyester resin (polyester resin particle).

The polyester resin generally includes a unit derived from a polyhydric alcohol and a unit derived from a polycarboxylic acid. A structure including ester bond (—COO—) and formed of the unit derived from the polyhydric alcohol and the unit derived from the polycarboxylic acid is also described as "ester unit".

[Polyhydric Alcohol]

The polyhydric alcohol may include polyhydric alcohols with a valency of two to four. The polyhydric alcohol may include polyhydric alcohols having aliphatic groups, polyhydric alcohols having aromatic groups, sugar alcohols and the like. The polyhydric alcohol may include, for example: dihydric alcohols such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl)propane [bisphenol A]; trihydric alcohols such as glycerin, trimethylolethane and trimethylolpropane; tetrahydric alcohols such as pentaerythritol; and the like. An oligomer (low molecular polymer with a molecular amount of 1,000 or less) can be also used as the polyhydric alcohol. The proportion (% by mass) of the unit derived from the polyhydric alcohol in the polyester resin forming the first resin particle is preferably 40.0% by mass or more to 60.0% or less.

The polyhydric alcohols having aromatic groups are preferably used as the polyhydric alcohol. Among these, bisphenol A is preferably used. Moreover, the polyhydric alcohols having aromatic groups and the polyhydric alcohols having aliphatic groups may be used together. The linear or branched polyhydric alcohols having aliphatic groups and having one to six carbon atoms are preferable as the polyhydric alcohols with aliphatic groups. Among these, ethylene glycol and neopentyl glycol are preferable.

[Polycarboxylic Acid]

The polycarboxylic acid forming the unit derived from the polycarboxylic acid may include polycarboxylic acids with a valency of two to four. The polycarboxylic acid may include: polycarboxylic acids having aliphatic groups; polycarboxylic acids having aromatic groups; polycarboxylic acids containing nitrogen; and the like. The polycarboxylic acid may include, for example: dicarboxylic acids such as glutaric acid, adipic acid, terephthalic acid, isophthalic acid and 2,6-naphthalene dicarboxylic acid; tricarboxylic acids such as trimellitic acid; tetracarboxylic acids such as ethylenediaminetetraacetic acid; and the like. An oligomer (low molecular polymer with a molecular amount of 1,000 or less) can be also used as the polycarboxylic acid. The proportion (% by mass) of the unit derived from the polycarboxylic acid in the polyester resin forming the first resin particle is preferably 40.0% by mass or more to 60.0% or less.

The polycarboxylic acids having aromatic groups are preferably used as the polycarboxylic acid. Among these, adipic acid, terephthalic acid, isophthalic acid and trimellitic acid are preferably used. Moreover, multiple different types of carboxylic acids are preferably used. Specifically, multiple types of dicarboxylic acids are preferably used. Among these, terephthalic acid and isophthalic acid are preferably used.

[Glass-Transition Temperature of First Resin Particle]

The glass-transition temperature of the first resin particle is preferably 50° C. or more, more preferably, 80° C. or more. The glass-transition temperature is temperature at which the resin particle transitions from a glass state to a viscous state and is a physical property value serving as an index indicating how easily the resin particle can be softened. The lower the glass-transition temperature is, the more the resin particle tends to be present in a soft state around normal temperature (25° C.). The softer the resin particle is, the more it tends to deform by external force. When the glass-transition temperature of the first resin particle is less than 50° C., a resin film formed by the first resin particle is more likely to become soft and is less likely to stably hold the pigment in the recording medium to which the ink is applied. Accordingly, the effect of improving the abrasion resistance of an image cannot be sufficiently obtained in some cases. The glass-transition temperature of the first resin particle is preferably 100° C. or less. The glass-transition temperature of the resin particle can be measured by using a thermoanalysis apparatus such as a differential scanning calorimeter (DSC).

[Method of Manufacturing First Resin Particle]

The first resin particle can be manufactured by, for example, synthesizing the polyester resin and then forming the polyester resin into particle. The polyester resin can be obtained by, for example, causing the polyhydric alcohol to react with the polycarboxylic acid (esterification). So-called transesterification in which some of ester bonds are cut by adding one of the polyhydric alcohol and the polycarboxylic acid may be performed as necessary. A polycarboxylic acid with a valance of three or more (among such acids, preferably trimellitic acid) is preferably added to cause transesterification. The synthesized polyester resin is preferably processed into an appropriate form by pressure application, pulverization or the like and then formed into particle by dispersion method, phase inversion (emulsion) method or the like.

[Analysis of First Resin Particle]

The composition of the polyester resin forming the first resin particle can be analyzed in, for example, the following method. First, the resin particle is dissolved in an organic solvent such as tetrahydrofuran to prepare a specimen. The prepared specimen is analyzed by an analysis method such as nuclear magnetic resonance (NMR) spectroscopy or matrix assisted laser desorption/ionization-mass spectrometry (MALDI-MS) to find the types and proportions of units (monomers) forming the polyester resin. Moreover, the units (monomers) forming the polyester resin can be also detected by analyzing the first resin particle by pyrolysis gas chromatography.

[Second Resin Particle Formed of Urethane Resin]

The ink of the second embodiment contains the second resin particle formed of a urethane resin. The proportion (% by mass) of the urethane resin in the resin forming the second resin particle is preferably 90.0% by mass or more based on the total mass of the resin particle and may be 100.0%. Specifically, the second resin particle is preferably formed substantially only of the urethane resin. A commercially-available resin may be used as the urethane resin (urethane resin particle).

The urethane resin generally used in the aqueous ink for ink jet is synthesized by using at least polyisocyanate and a component (polyol or polyamine) that reacts with polyisocyanate, and a cross-linking agent and a chain extender are also used as necessary.

[Polyisocyanate]

"Polyisocyanate" in the present invention means a compound having two or more isocyanate groups in the molecule. Polyisocyanate may include aliphatic and aromatic polyisocyanates and the like. Aliphatic polyisocyanates may include: polyisocyanates with linear structures such as tetramethylene diisothiocyanate, hexamethylene diisocyanate, dodecamethylene diisocyanate, and 2,2,4-trimethylhexamethylene diisocyanate; polyisocyanates with cyclic structures such as isophorone diisocyanate, hydrogenated xylylene diisocyanate and 1,4-cyclohexane diisocyanate; and the like. Aromatic polyisocyanates may include tolylene diisocyanate, xylylene diisocyanate and the like. Among these, the aliphatic polyisocyanates are preferable. The proportion (% by mol) of the unit derived from the polyisocyanate in the urethane resin forming the second resin particle is preferably 10.0% by mol or more to 80.0% or less.

[Polyol, Polyamine]

Polyol or polyamine can be used as the component that reacts with the aforementioned polyisocyanate to become a unit forming the urethane resin. "Polyol" in the present invention means a compound having two or more hydroxy groups in the molecule. Polyol may include: polyols having no acid groups such as polyether polyol, polyester polyol and polycarbonate polyol; polyols having acid groups; and the like. Moreover, "polyamine" in the present invention means a compound that has two or more "amino groups or imino groups" in the molecule. The proportion (% by mol) of the unit derived from the polyol and the polyamine in the urethane resin forming the second resin particle is preferably 10.0% by mol or more to 80.0% or less.

The following compounds can be given as the polyols having no acid groups. Polyether polyol may include: addition polymers of polyols and alkylene oxides; glycols such as (poly)alkylene glycol; and the like. Polyester polyol may include acid ester and the like. Polycarbonate polyol may include alkane diol-based polycarbonate diol and the like. The number average molecular weight of the polyol having no acid group is preferably 400 or more to 4,000 or less. The polyol having no acid group is preferably polyether polyol or polycarbonate polyol, more preferably polyether polyol. Moreover, the polyols having acid groups may include polyols having carboxyl groups such as dimethylol acetic acid, dimethylol propionic acid and dimethylol butyric acid.

Polyamine may include: monoamines having multiple hydroxy groups such as dimethylethylamine; bifunctional polyamines such as ethylenediamine, isophoronediamine and xylylenediamine; polyamines with three or more functions such as diethylenetriamine, triethlenetetramine and tetraethylenepentamine; and the like. For the sake of convenience, compounds having multiple hydroxy groups and one "amino group or imino group" are listed as "polyamine".

[Cross-Linking Agent, Chain Extender]

The urethane resin may include a unit derived from the cross-linking agent or the chain extender. Generally, the cross-linking agent is used in synthesizing of prepolymer. Generally, the chain extender is used to extend a prepolymer synthesized in advance. The cross-linking agent and the chain extender can be basically selected from water, the aforementioned polyisocyanate, polyol, polyamine and the like as appropriate depending on application such as cross-liking or chain extending and be used.

[Glass-Transition Temperature of Second Resin Particle]

The glass-transition temperature of the second resin particle is preferably −40° C. or more, more preferably −35° C. or more. When the glass-transition temperature of the second resin particle is less than −40° C., a resin film formed by the second resin particle is more likely to become soft and is less likely to stably hold the pigment in the recording medium to which the ink is applied. Accordingly, the effect of improving the abrasion resistance of an image cannot be sufficiently obtained in some cases. The glass-transition temperature of the second resin particle is preferably 100° C. or less, more preferably 80° C. or less.

[Method of Manufacturing Second Resin Particle]

The second resin particle can be manufactured by, for example, synthesizing the urethane resin and then forming the urethane resin into particle. The urethane resin can be obtained by, for example, causing the polyisocyanate to react with a compound (polyol, polyamine) that reacts with the polyisocyanate under presence of the organic solvent. The synthesized polyester resin is preferably formed into particle by dispersion method, phase inversion (emulsion) method or the like under the presence of an acid group as necessary.

[Analysis of Second Resin Particle]

The composition of the urethane resin forming the second resin particle can be analyzed in, for example, the following method. First, the resin particle is dissolved in an organic solvent such as deuterated dimethyl sulfoxide to prepare a specimen. The prepared specimen is analyzed by proton nuclear magnetic resonance ($^1$H-NMR) and the types and proportions of the units (monomers) forming the urethane resin can be found from the positions of the peaks obtained by the analysis and a ratio of integrated values of the chemical shift peaks for the respective components. Moreover, the units (monomers) forming the urethane resin can be also detected by analyzing the second resin particle by pyrolysis gas chromatography.

(Organic Solvent)

The ink of the first embodiment contains at least one type of organic solvent selected from the group consisting of the compound represented by the general formula (1), the compound represented by the general formula (2) and the compound represented by the general formula (3). Meanwhile, the ink of the second embodiment contains at least one type of organic solvent selected from the group consisting of the compound represented by the general formula (1) and the compound represented by the general formula (2). The content (% by mass) of the organic solvent in the ink is preferably 0.1% by mass or more to 25.0% or less based on the total mass of the ink, more preferably 0.2% or more to 15.0% or less.

[Compound Represented by General Formula (1)]

The compound represented by the general formula (1) is a linear carbonate compound. The compound represented by the general formula (1) has such a characteristic that a proportion of structures similar to the ester bond (—COO—) of the polyester resin and the urethane bond (—NH—COO—) of the urethane resin in the molecule thereof is high. Accordingly, the compound represented by the general formula (1) tends to specifically soften the first resin particle and the second resin particle and it is possible to improve the abrasion resistance of the image and avoid degradation of ejection stability.

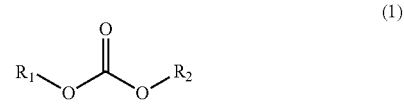

(1)

(In the general formula (1), $R_1$ and $R_2$ each independently represent a linear or branched alkyl group with one to six carbon atoms.)

In the general formula (1), $R_1$ and $R_2$ each independently represent a linear or branched alkyl group with one to six carbon atoms. When the number of carbon atoms in the alkyl group represented by each of $R_1$ and $R_2$ in the general formula (1) is seven or more, the viscosity of the ink tends to be high and the ejection stability decreases. Thus, this is not preferable. The linear or branched alkyl group with one to six carbon atoms represented by each of $R_1$ and $R_2$ may include methyl group, ethyl group, n-propyl group, i-hexyl group, i-propyl group, t-butyl group and the like. The compound represented by the general formula (1) is preferably dimethyl carbonate, diethyl carbonate, ethyl methyl carbonate or the like.

[Compound Represented by General Formula (2)]

The compound represented by the general formula (2) is a cyclic carbonate compound. The compound represented by the general formula (2) has such a characteristic that a proportion of structures similar to the ester bond (—COO—) of the polyester resin and the urethane bond (—NH—COO—) of the urethane resin in the molecule thereof is high. Accordingly, the compound represented by the general formula (2) tends to specifically soften the first resin particle and the second resin particle and it is possible to improve the abrasion resistance of the image and avoid degradation of ejection stability.

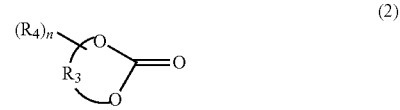

(2)

(In the general formula (2), $R_3$ represents an ethylene group or a propylene group, $R_4$ represents a methyl group or an ethyl group, n represents 0 or 1 and n is 1 when $R_3$ is ethylene group.)

In the general formula (2), $R_3$ represents an ethylene group or a propylene group. Moreover, in the general formula (2), $R_4$ represents a methyl group or an ethyl group, n represents 0 or 1 and n is 1 when $R_3$ is an ethylene group. When: $R_3$ is an alkyl group with four or more carbon atoms; $R_4$ is an alkyl group with three or more carbon atoms; or $R_3$ is an ethylene group and there is no $R_4$ (n=0) in the general formula (2), the viscosity of the ink tends to be high and the ejection stability decreases. Thus, this is not preferable. The compound represented by the general formula (2) is preferably propylene carbonate, butylene carbonate or the like and propylene carbonate is preferable among these.

[Compound Represented by General Formula (3)]

The compound represented by the general formula (3) is a dioxolane compound. The compound represented by the general formula (3) has such a characteristic that a proportion of structures similar to the ester bond (—COO—) of the polyester resin in the molecule thereof is high. Accordingly, the compound represented by the general formula (3) tends to specifically soften the first resin particle and it is possible to improve the abrasion resistance of the image and avoid degradation of ejection stability. However, when the second resin particle formed of the urethane resin is used, strong interaction with a hydroxy group of the compound represented by the general formula (3) occurs also in the ink and the level of ejection stability is thus lower.

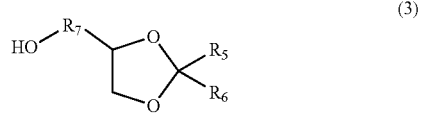

(3)

(In the general formula (3), $R_5$ and $R_6$ each independently represent a linear or branched alkyl group with one to four carbon atoms and $R_7$ represents an alkylene group with one to four carbon atoms.)

In the general formula (3), $R_5$ and $R_6$ each independently represent a linear or branched alkyl group with one to four carbon atoms. Moreover, in the general formula (3), $R_7$ represents an alkylene group with one to four carbon atoms. When the number of carbon atoms in the alkylene group represented by each of $R_5$ and $R_6$ is five or more or when the number of carbon atoms in the alkylene group represented by $R_7$ is five or more in the general formula (3), the viscosity of the ink tends to be high and the ejection stability decreases. Thus, this is not preferable. The linear or branched alkylene group with one to four carbon atoms represented by each of $R_5$ and $R_6$ may include methyl group, ethyl group, n-propyl group, n-butyl group, i-propyl group, t-butyl group and the like. The alkylene group with one to four carbon atoms represented by $R_7$ may include methylene group, ethylene group, n-propylene group, n-butylene group and the like. The compound represented by the general formula (3) is preferably 2,2-dimethyl-1,3-dioxolane-4-methanol, 2,2-diethyl-1,3-dioxolane-4-methanol, 2,2-dimethyl-1,3-dioxolane-4-ethanol or the like.

The compound represented by the general formula (2) and the compound represented by the general formula (3) (cyclic carbonate compound, dioxolane compound) have higher effects of improving the abrasion resistance of the image than the compound represented by the general formula (1) (linear carbonate compound). This is because the compound represented by the general formula (2) and the compound represented by the general formula (3) tend to have higher relative permittivity and are more likely to soften the resin particle.

The mass ratio of the content (% by mass) of the resin particle to the content (% by mass) of the organic solvent in the ink is preferably 0.1 times or more to 10.0 times or less, more preferably 0.1 times or more to 5.0 times or less. When the mass ratio is 0.1 times or more, the organic solvent can efficiently soften the resin particle and the effect of improving the abrasion resistance of the image tends to increase. Meanwhile, when the mass ratio is 10.0 times or less, preferably 5.0 times or less, excessive softening of the resin particle by the organic solvent is less likely to occur. Accordingly, an excessive increase in viscosity of the ink is suppressed and a high level of ejection stability can be obtained. The mass ratio is more preferably 1.0 time or more.

(Aqueous Medium)

The ink is an aqueous ink that contains at least water as an aqueous medium. Deionized water or ion-exchanged water is preferably used as water. The content (% by mass) of water in the ink is preferably 40.0% by mass or more based on the total mass of the ink, more preferably 45.0% or more, particularly preferably 50.0% or more. Moreover, the content (% by mass) of water in the ink is preferably 95.0% by mass or less based on the total mass of the ink, more preferably 90.0% or less. Furthermore, any water-soluble organic solvent generally used in ink can be used. For example, the water-soluble organic solvent may include alcohols, (poly)alkylene glycols, compounds containing nitrogen, compounds containing sulfur and the like. It is preferable that a water-soluble organic solvent such as glycol ether is not used and, if such a solvent is to be used, the amount thereof is small (about 0.1% by mass or less). The content (% by mass) of the water-soluble organic solvent in the ink is preferably 3.0% by mass or more to 50.0% or less based on the total mass of the ink. This content of the water-soluble organic solvent includes the content of the organic solvent described above.

(Other Additives)

The ink may contain, in addition to the components described above, water-soluble organic compounds that are solid at normal temperature, for example, polyhydric alcohols such as trimethylolpropane and trimethylolethane, urea and urea derivatives such as ethyleneurea as necessary. The ink may also contain various additives such as surfactant, pH adjuster, antirust agent, antiseptic, fungicide, oxidation inhibitor, reduction inhibitor, evaporation promoter, chelating agent and other resins as necessary.

<Ink Cartridge>

The ink cartridge of the present invention includes an ink and an ink storage portion that stores the ink. The ink stored in the ink storage portion is the aqueous ink of the present invention described above. FIG. 1 is a cross-sectional diagram schematically illustrating an embodiment of the ink cartridge in the present invention. As illustrated in FIG. 1, an ink supply port 12 for supplying the ink to the recording head is provided on a bottom surface of the ink cartridge. The inside of the ink cartridge is the ink storage portion for storing the ink. The ink storage portion is formed of an ink storage chamber 14 and an absorber housing chamber 16 and these chambers communicate with each other via a communication port 18. Moreover, the absorber housing chamber 16 communicates with the ink supply port 12. Liquid ink 20 is stored in the ink storage chamber 14 and absorbers 22 and 24 that hold the ink in an impregnated state are housed in the absorber housing chamber 16. The ink storage portion may be in a form that has no ink storage chamber configured to store the liquid ink and holds the total amount of stored ink with the absorbers. Moreover, the ink storage portion may be in a form that has no absorbers and stores the total amount of ink in a liquid state. Moreover, the ink cartridge may be in a form configured to include the ink storage portion and the recording head.

<Ink Jet Recording Method>

An ink jet recording method of the present invention is a method of recording an image on a recording medium by ejecting the aqueous ink of the present invention described above from an ink jet recording head. A method of ejecting the ink may include a method of applying mechanical energy to the ink and a method of applying thermal energy to the ink. In the present invention, the method of ejecting the ink by applying thermal energy to the ink is particularly preferably employed. Steps of the ink jet recording method other than the use of the ink of the present invention may be publicly known steps.

Figure 2A:
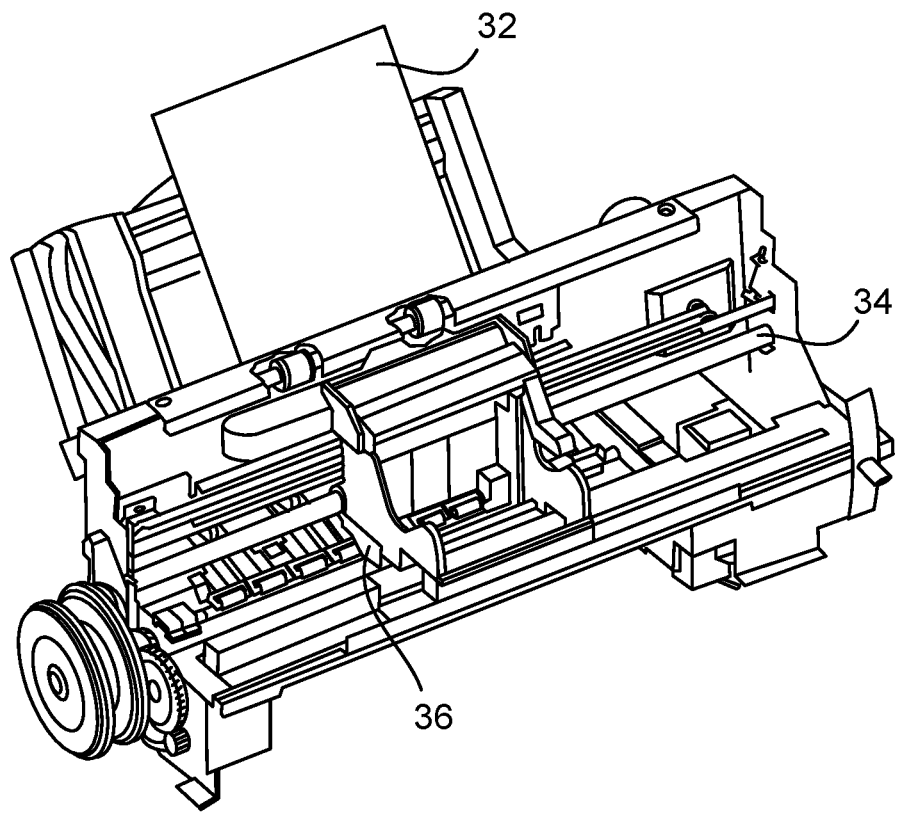
FIGS. 2A and 2B are diagrams schematically illustrating an example of an ink jet recording apparatus used in an ink jet recording method of the present invention.
Figure 2B:
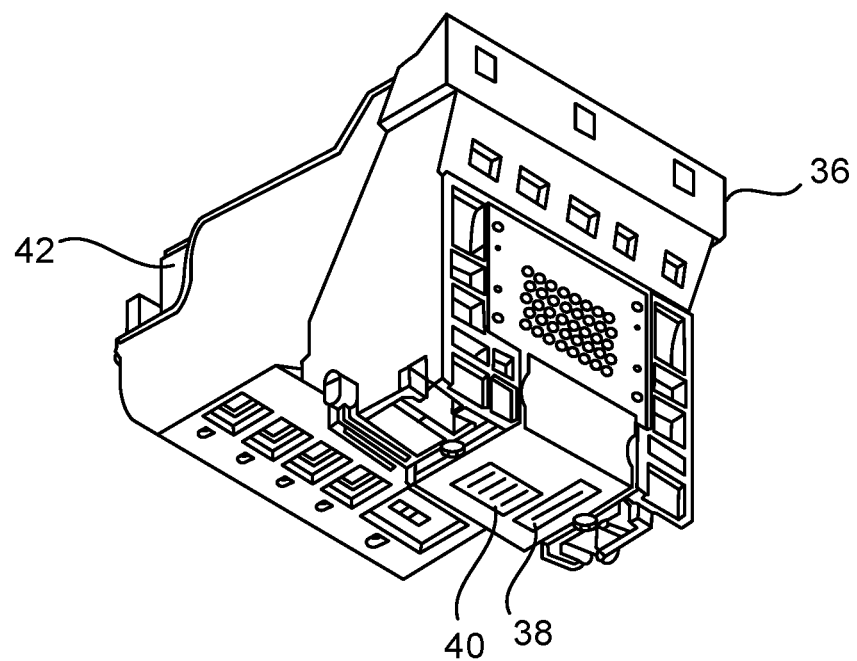

FIGS. 2A and 2B are diagrams schematically illustrating an example of an ink jet recording apparatus used in the ink jet recording method of the present invention, FIG. 2A is a perspective view of a main portion of the ink jet recording apparatus and FIG. 2B is a perspective view of a head cartridge. The ink jet recording apparatus is provided with a conveyance unit (not illustrated) that conveys a recording medium 32 and a carriage shaft 34. A head cartridge 36 can be mounted on the carriage shaft 34. The head cartridge 36 includes recording heads 38 and 40 and is configured such that an ink cartridge 42 is set therein. The ink (not illustrated) is ejected from the recording heads 38 and 40 toward the recording medium 32 while the head cartridge 36 is conveyed in a main scanning direction along the carriage shaft 34. Then, the conveyance unit (not illustrated) conveys the recording medium 32 in a sub-scanning direction and an image is thereby recorded on the recording medium 32. A recording head of a serial type or a recording head of a line type can be used as the recording head 38 and the recording head of the serial type is preferably used.

The recording medium to which an image is to be recorded by using the ink is not limited to a particular medium. For example, any of a recording medium with no coating layer, a recording medium with a coating layer and the like can be used. The recording medium with no coating layer may include plain paper and the like. The recording medium with a coating layer may include a recoding medium with ink absorptivity such as glossy paper and matt paper for ink jet. Moreover, the recording medium may include a recording medium (hereinafter, sometimes referred to as "non-absorbing recording medium") with low ink absorptivity or no ink absorptivity such as actual recording stock and resin material. Among these, the non-absorbing recording medium is preferably used. The non-absorbing recording medium is a recording medium in which an amount of water absorbed in 30 msec$^{1/2}$ from contact start is 10 mL/m$^2$ or less in Bristow method described in "test method of liquid absorptivity of paper and paperboard" in paper and pulp test method No. 51 of Japan TAPPI. In the present invention, a recording medium that satisfies the aforementioned condition of an absorbed water amount is defined as "non-absorbing recording medium". Moreover, a base material of the recording medium with a coating layer may include paper, resin and the like and a paper-based based material is preferable among these.

EXAMPLES

The present invention is described below in further details by using examples and comparative examples. Note that the present invention is not limited by the following examples within the gist of the present invention. The description of "part" and "%" regarding the contents are based on mass unless otherwise noted.

<Preparation of Pigment Dispersed Liquids>
(Pigment Dispersed Liquid 1)

First, 15.0 parts of a pigment (C.I. pigment blue 15:3), 35.0 parts of ion-exchange water and 50.0 parts of an aqueous solution (content of resin: 20.0%) obtained by dissolving a styrene-acrylic acid copolymer into water containing sodium hydroxide equimolar to the acid value of the styrene-acrylic acid copolymer were mixed to obtain a mixture. The styrene-acrylic acid copolymer was a water-soluble acrylic resin and had an acid value of 100 mgKOH/g and weight-average molecular weight of 10,000. The obtained mixture was dispersed for two hours by using a batch-type vertical sand mill and then a coarse particle was removed by centrifugal separation. Pressure filtering was performed by using a micro filter (manufactured by Fujifilm Corporation) with a pore size of 3.0 m to obtain a pigment dispersed liquid 1. The content of the pigment in the pigment dispersed liquid 1 was 15.0% and the content of the resin (solid content) was 10.0%.

(Pigment Dispersed Liquid 2)

A pigment dispersed liquid 2 was obtained in the same procedure as that for the pigment dispersed liquid 1 described above except for the point that C.I. pigment red 122 was used as the pigment. The content of the pigment in the pigment dispersed liquid 2 was 15.0% and the content of the resin was 10.0%.

(Pigment Dispersed Liquid 3)

A pigment dispersed liquid 3 was obtained in the same procedure as that for the pigment dispersed liquid 1 described above except for the point that C.I. pigment yellow 74 was used as the pigment. The content of the pigment in the pigment dispersed liquid 3 was 15.0% and the content of the resin was 10.0%.

(Pigment Dispersed Liquid 4)

A pigment dispersed liquid 4 was obtained in the same procedure as that for the pigment dispersed liquid 1 described above except for the point that carbon black (trade name "NIPex 170IQ" (manufactured by Orion Engineered Carbons SA) was used as the pigment. The content of the pigment in the pigment dispersed liquid 4 was 15.0% and the content of the resin was 10.0%.

(Pigment Dispersed Liquid 5)

A solution obtained by dissolving 5.0 g of concentrated hydrochloric acid into 5.5 g of water was cooled to 5° C. and 1.6 g of 4-aminophthalic acid was added to the solution in this state. A container containing this solution was put in an ice bath and a solution obtained by dissolving 1.8 g of sodium nitrite into 9.0 g of ion-exchanged water at 5° C. was added to the solution in the container while the solution was stirred and maintained at temperature of 10° C. or less. After stirring of 15 minutes, 6.0 g of carbon black (trade name "NIPex 170IQ" (manufactured by Orion Engineered Carbons SA) was added under stirring and the mixture was stirred for another 15 minutes to obtain slurry. The obtained slurry was filtered with a filter paper (trade name "standard filter paper No. 2" manufactured by ADVANTEC) and a particle was sufficiently cleaned with water and dried in an oven at 110° C. Thereafter, a counter ion was substituted from a sodium ion to a potassium ion by an ion-exchanging method and a self-dispersible pigment in which a —$C_6H_3$—(COOK)$_2$ group was bonded to a particle surface of the carbon black was obtained. The content of the pigment was adjusted by adding an appropriate amount of ion-exchanged water and a pigment dispersed liquid 5 with a pigment content of 15.0% was obtained.

<Analysis Condition of Resin>
(Determining Whether Resin is Resin Particle or not, Particle Size)

Each of the liquids containing the resins was diluted with ion-exchanged water to prepare a specimen in which the content of the resin was about 1.0%. A particle counter employing a dynamic light scattering method was used on the specimen to measure the particle size (volume-based cumulative 50% particle size $D_{50}$) of the resin particle according to the measurement conditions described below. Trade name "NANOTRAC WAVE II-Q" (manufactured by MicrotracBEL Corp.) was used as the particle counter. The resin was determined to be the "resin particle" (to be the "water-dispersible resin") when a particle with a particle size was measured in this measurement method. Meanwhile, the resin was determined not to be the "resin particle" (to be the "water-soluble resin") when a particle with a particle size was not measured in this measurement method.

[Measurement Conditions]:
 Set Zero: 30 seconds
 Number of times of measurement: 3
 Measurement time: 180 seconds
 Shape: Sphere
 Index of refraction: 1.6
 Density: 1.0 g/cm$^3$ (Glass-Transition Temperature of Resin Particle)

Each of the liquids containing the resin particles was dried and solidified at 60° C. to obtain the resin particle and 2 mg of the resin particle was put in an aluminum container and sealed to prepare a specimen for measurement. Each of the prepared specimens was subjected to thermal analysis according to a temperature program described below by using a differential scanning calorimeter (trade name "Q1000" manufactured by TA Instruments) and a heating curve was created. Temperature at an intersection between a straight line and a tangent line in the created heating curve (horizontal axis: temperature, vertical axis: heat amount) was defined as the "glass-transition temperature of the resin particle", the straight line passing two points of the curve on the lower temperature side and extending to the high temperature side, the tangent line drawn at a point where the gradient of a step-shaped change portion in the curve was maximum.

[Temperature Program]:
 (1) Temperature increase of 10° C. per minute to 200° C.
 (2) Temperature decrease of 5° C. per minute from 200° C. to −50° C.
 (3) Temperature increase of 10° C. per minute from −50° C. to 200° C.

<Preparation of Resin>
(Resins 1 to 7)

A mixture of components (unit: part) described in the item of "esterification" in Table 1 was put in a reaction container installed in an autoclave and was heated at 220° C. for four hours to perform esterification. Then, the temperature was raised to 240° C. and the pressure was reduced to 13 Pa in 90 minutes. The state of 240° C. and reduced pressure of 13 Pa was maintained for five hours to continue the esterification (dehydration condensation) and then a nitrogen gas was introduced to return the pressure to normal pressure. After the temperature was raised to 220° C., catalyst (tetra-n-butyl titanate) and components (unit: parts) described in the item of "transesterification" of Table 1 were added and the mixture was heated at 220° C. for two hours to perform transesterification. The amount of catalyst used was "3×10$^{-4}$×total used amount (mol) of polycarboxylic acid". Thereafter, the nitrogen gas was introduced to achieve a pressurized state and a sheet-shaped resin was taken out. The taken-out resin was cooled to 25° C. and then pulverized with a crusher to obtain a polyester resin. The characteristics of the obtained polyester resin are described in Table 1. Meaning of the abbreviations of the respective components in Table 1 is described below.
 EG: Ethylene glycol
 NPG: Neopentyl glycol
 BPA: 2,2-bis(4-hydroxyphenyl)propane
 tPA: Terephthalic acid
 iPA: Isophthalic acid
 HAD: Adipic acid
 BTA: Trimellitic acid

TABLE 1

Table 1: Synthesis Conditions of Polyester Resin

| Polyester resin | Esterification | | | | | | | Transesterification | Total used amount | |
|---|---|---|---|---|---|---|---|---|---|---|
| | EG | NPG | BPA | tPA | iPA | HAD | BTA | HAD | Polyhydric Alcohol | Polycarboxylic Acid |
| 1 | 90.0 | | 10.0 | 50.0 | 50.0 | | 7.6 | 2.4 | 100.0 | 110.0 |
| 2 | 90.0 | | 10.0 | 33.5 | 33.0 | 33.5 | 7.6 | 2.4 | 100.0 | 110.0 |
| 3 | | 90.0 | 10.0 | 50.0 | 50.0 | | 7.6 | 2.4 | 100.0 | 110.0 |

A stirrer (trade name "tornado stirrer standard SM-104" manufactured by As One Corporation) was set in a beaker with a capacity of 2 L. Then, 210 g of one type of the polyester resin described in Table 2 and an amount (g) described in Table 2 of tetrahydrofuran were put in this beaker and stirred at 25° C. to dissolve the components. Then, an amount corresponding to an amount that the neutralization ratio (% by mol) based on the acid value of the polyester resin of 5.0% aqueous sodium hydroxide was added and the contents of the beaker were stirred for 30 minutes. Furthermore, 900 g of ion-exchanged water was added dropwise at a rate of 20 mL/min while the contents of the beaker were stirred at 25° C. at a stirring rate described in table 2. Thereafter, the temperature was raised to 60° C. and tetrahydrofuran and part of water were distilled away by depressurization. The beaker was put in a water bath and the contents of the beaker were stirred for one hour at 85° C. and were subjected to heat treatment. The contents of the beaker were filtered with a metal mesh of 150 mesh (150 gaps in one inch) and then the content of the resin particle was adjusted. Liquids containing resins 1 to 7 that respectively contained the resins 1 to 7 being the polyester resin and that had the resin content of 40.0% were thereby obtained. The characteristics of the obtained resins are described in Table 2.

(Liquid Containing Resin 17)

First, 32.8 parts of isophorone diisocyanate and 52.0 parts of polypropylene glycol with weight-average molecular weight of 2,000 were put in a four-neck flask including a stirrer, a thermometer, a nitrogen gas introduction pipe and a reflux pipe and were reacted at 100° C. for two hours under a nitrogen gas atmosphere. Then, 14.3 parts of dimethylol propionic acid, 0.9 parts of ethylenediamine and 150 parts of methyl ethyl ketone were added and reacted at 78° C. to obtain a reaction liquid. The obtained reaction liquid was cooled to 40° C., ion-exchanged water was added and potassium hydroxide equimolar to the acid value of the resin

TABLE 2

Table 2: Manufacturing Conditions of Resins 1 to 7

| Resin | Manufacturing conditions of resin particle | | | | Characteristics of resin particle | |
|---|---|---|---|---|---|---|
| | Type of polyester resin | Stirring rate (rpm) | Tetrahydrofuran (g) | Neutralization ratio (% by mol) | Glass-transition temperature (° C.) | $D_{50}$ (nm) |
| 1 | 1 | 150 | 390 | 80 | 86 | 120 |
| 2 | 2 | 150 | 390 | 80 | 40 | 120 |
| 3 | 3 | 150 | 390 | 80 | 64 | 120 |
| 4 | 1 | 500 | 490 | 80 | 86 | 20 |
| 5 | 1 | 500 | 390 | 80 | 86 | 30 |
| 6 | 1 | 30 | 210 | 70 | 86 | 300 |
| 7 | 1 | 30 | 210 | 60 | 86 | 320 |

(Liquids Containing Resins 8 to 16)

Liquids containing commercially-available resins described in Table 3 were prepared as liquids containing resins 8 to 16.

was added while the reaction liquid was stirred with a homomixer at high speed to obtain the liquid containing the resin. The methyl ethyl ketone was distilled away from the obtained liquid by heating and depressurization. The liquid

TABLE 3

Characteristics of Liquids Containing Resins 8 to 16

| Number of resin | Type | Content of resin (%) | Structure of polyisocyanate | Structure of polyol having no acid group | Glass-transition temperature (° C.) | $D_{50}$ (nm) |
|---|---|---|---|---|---|---|
| 8 | Liquid containing water-soluble polyester resin (trade name "Pluscoat Z-221" manufactured by Goo Chemical Co., Ltd.) | 20.0 | — | — | 47 | 0 |
| 9 | Liquid containing urethane resin particle (trade name "SUPERFLEX 470" manufactured by DKS Co. Ltd.) | 38.0 | Aliphatic polyisocyanate | Polycarbonate polyol | −31 | 50 |
| 10 | Liquid containing urethane resin particle (trade name "SUPERFLEX 300" manufactured by DKS Co. Ltd.) | 30.0 | Aliphatic polyisocyanate | Polyester polyol Polyether polyol | −42 | 70 |
| 11 | Liquid containing urethane resin particle (trade name "SUPERFLEX 740" manufactured by DKS Co. Ltd.) | 40.0 | Aromatic polyisocyanate | Polyester polyol | −34 | 200 |
| 12 | Liquid containing urethane resin particle (trade name "SUPERFLEX 830HS" manufactured by DKS Co. Ltd.) | 27.0 | Aromatic polyisocyanate | Polyester polyol | 68 | 10 |
| 13 | Liquid containing urethane resin particle (trade name "SUPERFLEX 460S" manufactured by DKS Co. Ltd.) | 38.0 | Aliphatic polyisocyanate | Polycarbonate polyol | −28 | 30 |
| 14 | Liquid containing urethane resin particle (trade name "SUPERFLEX 860" manufactured by DKS Co. Ltd.) | 40.0 | Aromatic polyisocyanate | Polyester polyol | 36 | 200 |
| 15 | Liquid containing urethane resin particle (trade name "SUPERFLEX E-4800" manufactured by DKS Co. Ltd.) | 40.0 | Aliphatic polyisocyanate | Polyether polyol | −65 | 300 |
| 16 | Liquid containing urethane resin particle (trade name "SUPERFLEX E-2000" manufactured by DKS Co. Ltd.) | 50.0 | Aliphatic polyisocyanate | Polyester polyol | −38 | 700 | containing a resin 17 that contained the resin 17 being the water-soluble urethane resin and that had the resin content of 40.0% was thereby obtained.

(Liquid Containing Resin 18)

First, 100.0 parts of monomer mixture was prepared by mixing 55.0 parts of methyl methacrylate, 30.0 parts of butyl acrylate and 15.0 parts of acrylic acid. Half (50.0 parts) of the aforementioned monomer mixture, 2.0 parts of sodium dodecylbenzene sulfonate (emulsifier) and 150.0 parts of ion-exchanged water were set in a four-neck flask containing a thermometer, a stirrer, a nitrogen gas introduction pipe and a reflux cooling pipe. Then, the mixture was stirred with a homogenizer (trade name "T50D ULTRA-TURRAX" manufactured by IKA) and was heated to 90° C. with the inside of the flask maintained under a nitrogen atmosphere by introducing nitrogen. Then, the remaining (50.0 parts) monomer mixture described above and a solution obtained by dissolving 1.0 parts of potassium peroxodisulfate in 20.0 parts of ion-exchanged water were added dropwise into the flask in two hours. Thereafter, the stirring was performed for two hours at 90° C. and then the temperature was returned to 25° C. Next, pH of the liquid was adjusted to 8.5 by using an appropriate amount of potassium hydroxide and an appropriate amount of ion-exchanged water was added to obtain a liquid containing a resin 18 that contained the resin 18 being the acryl resin particle and that had the resin content of 40.0%. The resin 18 had the glass-transition temperature of 37° C. and $D_{50}$ of 120 nm.

(Liquid Containing Resin 19)

A liquid containing a resin 19 that contained the resin 19 being the acryl resin particle and that had the resin content of 40.0% was obtained in the same procedure as the preparation of the liquid containing the resin 18, except for the point that butyl acrylate was changed to styrene. The resin 19 had the glass-transition temperature of 104° C. and $D_{50}$ of 120 nm.

<Preparation of Ink>

Inks were each prepared by mixing and sufficiently stirring the components (unit: %) described in an upper portion of Table 4 and then performing pressure filtering by using a micro filter (manufactured by Fujifilm Corporation) with a pore size of 3.0 m. A lower portion of Table 4 describes the characteristics of each ink. In the case of the inks containing the first resin particle, "content S of specific organic solvent" is the content of the compounds represented by the general formulae (1) to (3). Meanwhile, in the case of the inks containing the second resin particle, "content S of specific organic solvent" is the content of the compounds represented by the general formulae (1) and (2). Furthermore, in the case of the inks containing a resin other than the first resin particle and the second resin particle, "content S of specific organic solvent" is the content of the compounds represented by the general formulae (1) to (3).

TABLE 4

Compositions and Characteristics of Inks

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Type of pigment dispersed liquid | 1 | 2 | 3 | 4 | 5 | 1 | 1 | 1 | 1 | 1 | 1 | 1 | 1 | 1 | 1 |
| Type of resin | 1 | 1 | 1 | 1 | 1 | 1 | 1 | 1 | 1 | 1 | 1 | 1 | 1 | 2 | 3 | 4 |
| Pigment dispersed liquid | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Liquid containing resin | 6.3 | 6.3 | 6.3 | 6.3 | 6.3 | 6.3 | 6.3 | 6.3 | 6.3 | 6.3 | 6.3 | 6.3 | 6.3 | 6.3 | 6.3 |
| Diethyl carbonate | | | | | | 5.0 | | | | | | | | | |
| Dimethyl carbonate | | | | | | | 5.0 | | | | | | | | |
| Ethyl methyl carbonate | | | | | | | | 5.0 | | | | | | | |
| Propylene carbonate | 5.0 | 5.0 | 5.0 | 5.0 | 5.0 | | | | | | | | 5.0 | 5.0 | 5.0 |
| Butylene carbonate | | | | | | | | | 5.0 | | | | | | |
| Glycerol carbonate | | | | | | | | | | | | | | | |
| Ethylene carbonate | | | | | | | | | | | | | | | |
| 2,2-dimethyl-1,3-dioxolane-4-methanol | | | | | | | | | | 5.0 | | | | | |
| 2,2-diethyl-1,3-dioxolane-4-methanol | | | | | | | | | | | 5.0 | | | | |
| 2,2-dimethyl-1,3-dioxolane-4-ethanol | | | | | | | | | | | | 5.0 | | | |
| 2,2,4-trimethyl-1,3-dioxolane | | | | | | | | | | | | | | | |
| Glycerin | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion-exchanged water | 48.2 | 48.2 | 48.2 | 48.2 | 48.2 | 48.2 | 48.2 | 48.2 | 48.2 | 48.2 | 48.2 | 48.2 | 48.2 | 48.2 | 48.2 |
| Content R of resin particle (%) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Content S of specific organic solvent (%) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Value of S/R (times) | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Content of water (%) | 69.0 | 69.0 | 69.0 | 69.0 | 67.0 | 69.0 | 69.0 | 69.0 | 69.0 | 69.0 | 69.0 | 69.0 | 69.0 | 69.0 | 69.0 |

| | Examples | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Type of pigment dispersed liquid | 1 | 1 | 1 | 1 | 1 | 1 | 1 | 1 | 1 | 1 | 1 | 1 | 1 | 1 | 1 |
| Type of resin | 5 | 6 | 7 | 1 | 1 | 1 | 1 | 1 | 1 | 1 | 1 | 1 | 1 | 1 | 1 |
| Pigment dispersed liquid | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Liquid containing resin | 6.3 | 6.3 | 6.3 | 1.0 | 1.3 | 12.5 | 15.0 | 25.0 | 27.5 | 6.3 | 6.3 | 6.3 | 6.3 | 6.3 | 6.3 |
| Diethyl carbonate | | | | | | | | | | | | | | | |
| Dimethyl carbonate | | | | | | | | | | | | | | | |
| Ethyl methyl carbonate | | | | | | | | | | | | | | | |
| Propylene carbonate | 5.0 | 5.0 | 5.0 | 0.8 | 1.0 | 10.0 | 12.0 | 20.0 | 22.0 | 0.23 | 0.25 | 2.5 | 12.5 | 15.0 | 25.0 |
| Butylene carbonate | | | | | | | | | | | | | | | |
| Glycerol carbonate | | | | | | | | | | | | | | | |
| Ethylene carbonate | | | | | | | | | | | | | | | |
| 2,2-dimethyl-1,3-dioxolane-4-methanol | | | | | | | | | | | | | | | |
| 2,2-diethyl-1,3-dioxolane-4-methanol | | | | | | | | | | | | | | | |

TABLE 4-continued

Compositions and Characteristics of Inks

| | | | | | | | | | | | | | | | |
|---|---|---|---|---|---|---|---|---|---|---|---|---|---|---|---|
| 2,2-dimethyl-1,3-dioxolane-4-ethanol | | | | | | | | | | | | | | | |
| 2,2,4-trimethyl-1,3-dioxolane | | | | | | | | | | | | | | | |
| Glycerin | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion-exchanged water | 48.2 | 48.2 | 48.2 | 57.7 | 57.2 | 37.0 | 32.5 | 14.5 | 10.0 | 52.97 | 52.95 | 50.7 | 40.7 | 38.2 | 28.2 |
| Content R of resin particle (%) | 2.5 | 2.5 | 2.5 | 0.4 | 0.5 | 5.0 | 6.0 | 10.0 | 11.0 | 2.5 | 2.5 | 2.5 | 2.5 | 2.5 | 2.5 |
| Content S of specific organic solvent (%) | 5.0 | 5.0 | 5.0 | 0.8 | 1.0 | 10.0 | 12.0 | 20.0 | 22.0 | 0.23 | 0.25 | 2.5 | 12.5 | 15.0 | 25.0 |
| Value of S/R (times) | 2.0 | 2.0 | 2.0 | 2.0 | 2.0 | 2.0 | 2.0 | 2.0 | 2.0 | 0.09 | 0.10 | 1.0 | 5.0 | 6.0 | 10.0 |
| Content of water (%) | 69.0 | 69.0 | 69.0 | 75.3 | 75.0 | 61.5 | 58.5 | 46.5 | 43.5 | 73.8 | 73.7 | 71.5 | 61.5 | 59.0 | 49.0 |

| | Examples | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Type of pigment dispersed liquid | 1 | 1 | 2 | 3 | 4 | 5 | 1 | 1 | 1 | 1 | 1 | 1 | 1 | 1 | 1 |
| Type of resin | 1 | 9 | 9 | 9 | 9 | 9 | 9 | 9 | 9 | 9 | 10 | 11 | 12 | 13 | 14 |
| Pigment dispersed liquid | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Liquid containing resin | 6.3 | 6.5 | 6.5 | 6.5 | 6.5 | 6.5 | 6.5 | 6.5 | 6.5 | 6.5 | 8.4 | 6.3 | 9.1 | 6.5 | 6.3 |
| Diethyl carbonate | | | | | | | 5.0 | | | | | | | | |
| Dimethyl carbonate | | | | | | | | 5.0 | | | | | | | |
| Ethyl methyl carbonate | | | | | | | | | 5.0 | | | | | | |
| Propylene carbonate | 27.7 | 5.0 | 5.0 | 5.0 | 5.0 | 5.0 | | | | | 5.0 | 5.0 | 5.0 | 5.0 | 5.0 |
| Butylene carbonate | | | | | | | | | | 5.0 | | | | | |
| Glycerol carbonate | | | | | | | | | | | | | | | |
| Ethylene carbonate | | | | | | | | | | | | | | | |
| 2,2-dimethyl-1,3-dioxolane-4-methanol | | | | | | | | | | | | | | | |
| 2,2-diethyl-1,3-dioxolane-4-methanol | | | | | | | | | | | | | | | |
| 2,2-dimethyl-1,3-dioxolane-4-ethanol | | | | | | | | | | | | | | | |
| 2,2,4-trimethyl-1,3-dioxolane | | | | | | | | | | | | | | | |
| Glycerin | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion-exchanged water | 25.5 | 48.0 | 48.0 | 48.0 | 48.0 | 48.0 | 48.0 | 48.0 | 48.0 | 48.0 | 46.1 | 48.2 | 45.4 | 48.0 | 48.2 |
| Content R of resin particle (%) | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| Content S of specific organic solvent (%) | 27.7 | 5.0 | 5.0 | 5.0 | 5.0 | 5.0 | 5.0 | 5.0 | 5.0 | 5.0 | 5.0 | 5.0 | 5.0 | 5.0 | 5.0 |
| Value of S/R (times) | 11.1 | 2.0 | 2.0 | 2.0 | 2.0 | 2.0 | 2.0 | 2.0 | 2.0 | 2.0 | 2.0 | 2.0 | 2.0 | 2.0 | 2.0 |
| Content of water (%) | 46.3 | 69.0 | 69.0 | 69.0 | 69.0 | 67.0 | 69.0 | 69.0 | 69.0 | 69.0 | 69.0 | 69.0 | 69.0 | 69.0 | 69.0 |

| | Examples | | | | | | | | | | | | | | |
|---|---|---|---|---|---|---|---|---|---|---|---|---|---|---|---|
| | 46 | 47 | 48 | 49 | 50 | 51 | 52 | 53 | 54 | 55 | 56 | 57 | 58 | 59 | 60 |
| Type of pigment dispersed liquid | 1 | 1 | 1 | 1 | 1 | 1 | 1 | 1 | 1 | 1 | 1 | 1 | 1 | 1 | 1 |
| Type of resin | 15 | 16 | 9 | 9 | 9 | 9 | 9 | 9 | 9 | 9 | 9 | 9 | 9 | 9 | 9 |
| Pigment dispersed liquid | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Liquid containing resin | 6.3 | 5.0 | 1.0 | 1.4 | 13.1 | 15.8 | 26.2 | 29.0 | 6.5 | 6.5 | 6.5 | 6.5 | 6.5 | 6.5 | 6.5 |
| Diethyl carbonate | | | | | | | | | | | | | | | |
| Dimethyl carbonate | | | | | | | | | | | | | | | |
| Ethyl methyl carbonate | | | | | | | | | | | | | | | |
| Propylene carbonate | 5.0 | 5.0 | 0.8 | 1.0 | 10.0 | 12.0 | 20.0 | 22.0 | 0.23 | 0.25 | 2.5 | 12.5 | 15.0 | 25.0 | 27.7 |
| Butylene carbonate | | | | | | | | | | | | | | | |
| Glycerol carbonate | | | | | | | | | | | | | | | |
| Ethylene carbonate | | | | | | | | | | | | | | | |
| 2,2-dimethyl-1,3-dioxolane-4-methanol | | | | | | | | | | | | | | | |
| 2,2-diethyl-1,3-dioxolane-4-methanol | | | | | | | | | | | | | | | |
| 2,2-dimethyl-1,3-dioxolane-4-ethanol | | | | | | | | | | | | | | | |
| 2,2,4-trimethyl-1,3-dioxolane | | | | | | | | | | | | | | | |
| Glycerin | 20.0 | 20.0 | 20.0 | 20.0 | 20.0 | 20.0 | 20.0 | 20.0 | 20.0 | 20.0 | 20.0 | 20.0 | 20.0 | 20.0 | 20.0 |
| Acetylenol E100 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ion-exchanged water | 48.2 | 49.5 | 57.7 | 57.1 | 36.4 | 31.7 | 13.3 | 8.5 | 52.77 | 52.75 | 50.5 | 40.5 | 38.0 | 28.0 | 25.3 |
| Content R of resin particle (%) | 2.5 | 2.5 | 0.4 | 0.5 | 5.0 | 6.0 | 10.0 | 11.0 | 2.5 | 2.5 | 2.5 | 2.5 | 2.5 | 2.5 | 2.5 |
| Content S of specific organic solvent (%) | 5.0 | 5.0 | 0.8 | 1.0 | 10.0 | 12.0 | 20.0 | 22.0 | 0.23 | 0.25 | 2.5 | 12.5 | 15.0 | 25.0 | 27.7 |
| Value of S/R (times) | 2.0 | 2.0 | 2.0 | 2.0 | 2.0 | 2.0 | 2.0 | 2.0 | 0.09 | 0.10 | 1.0 | 5.0 | 6.0 | 10.0 | 11.1 |
| Content of water (%) | 69.0 | 69.0 | 75.3 | 75.0 | 61.5 | 58.5 | 46.5 | 43.5 | 73.8 | 73.8 | 71.5 | 61.5 | 59.0 | 49.0 | 46.3 |

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Type of pigment dispersed liquid | 1 | 1 | 1 | 1 | 1 | 1 | 1 | 1 | 1 | 1 |
| Type of resin | — | 8 | 1 | 1 | 1 | 1 | 17 | 9 | 9 | 9 |
| Pigment dispersed liquid | 20.0 | 20.0 | 20.0 | 20.0 | 20.0 | 20.0 | 20.0 | 20.0 | 20.0 | 20.0 |
| Liquid containing resin | 0.0 | 12.6 | 6.3 | 6.3 | 6.3 | 6.3 | 6.3 | 6.5 | 6.5 | 6.5 |
| Diethyl carbonate | | | | | | | | | | |
| Dimethyl carbonate | | | | | | | | | | |
| Ethyl methyl carbonate | | | | | | | | | | |
| Propylene carbonate | 5.0 | 5.0 | | | | | 5.0 | | | |
| Butylene carbonate | | | | | | | | | | |
| Glycerol carbonate | | | | | 5.0 | | | | 5.0 | |

TABLE 4-continued

Compositions and Characteristics of Inks

| | | | | | | | | | | |
|---|---|---|---|---|---|---|---|---|---|---|
| Ethylene carbonate | | | | | 5.0 | | | | | 5.0 |
| 2,2-dimethyl-1,3-dioxolane-4-methanol | | | | | | | | | | |
| 2,2-diethyl-1,3-dioxolane-4-methanol | | | | | | | | | | |
| 2,2-dimethyl-1,3-dioxolane-4-ethanol | | | | | | | | | | |
| 2,2,4-trimethyl-1,3-dioxolane | | | | | | 5.0 | | | | |
| Glycerin | 20.0 | 20.0 | 20.0 | 20.0 | 20.0 | 20.0 | 20.0 | 20.0 | 20.0 | 20.0 |
| Acetylenol E100 | 0.5 | 0.5 | 0.5 | 0.5 | 0.5 | 0.5 | 0.5 | 0.5 | 0.5 | 0.5 |
| Ion-exchanged water | 54.5 | 41.9 | 53.2 | 48.2 | 48.2 | 48.2 | 48.2 | 53.0 | 48.0 | 48.0 |
| Content R of resin particle (%) | 0.0 | 0.0 | 2.5 | 2.5 | 2.5 | 2.5 | 0.0 | 2.5 | 2.5 | 2.5 |
| Content S of specific organic solvent (%) | 5.0 | 5.0 | 0.0 | 0.0 | 0.0 | 0.0 | 5.0 | 0.0 | 0.0 | 0.0 |
| Value of S/R (times) | — | — | 0.0 | 0.0 | 0.0 | 0.0 | — | 0.0 | 0.0 | 0.0 |
| Content of water (%) | 71.5 | 69.0 | 74.0 | 69.0 | 69.0 | 69.0 | 69.0 | 74.0 | 69.0 | 69.0 |

| | Comparative Examples | | | | | | | | |
|---|---|---|---|---|---|---|---|---|---|
| | 11 | 12 | 13 | 14 | 15 | 16 | 17 | 18 | 19 |
| Type of pigment dispersed liquid | 1 | 1 | 1 | 1 | 1 | 1 | 1 | 1 | 1 |
| Type of resin | 9 | 9 | 9 | 18 | 18 | 19 | 18 | 18 | 9 |
| Pigment dispersed liquid | 20.0 | 20.0 | 20.0 | 20.0 | 20.0 | 20.0 | 20.0 | 20.0 | 29.0 |
| Liquid containing resin | 6.5 | 6.5 | 6.5 | 6.3 | 6.3 | 6.3 | 6.3 | 6.3 | 15.7 |
| Diethyl carbonate | | | | 5.0 | | | | | |
| Dimethyl carbonate | | | | | | | | | |
| Ethyl methyl carbonate | | | | | | | | | |
| Propylene carbonate | | | | | 5.0 | 5.0 | | | |
| Butylene carbonate | | | | | | | 5.0 | | |
| Glycerol carbonate | | | | | | | | | |
| Ethylene carbonate | | | | | | | | | |
| 2,2-dimethyl-1,3-dioxolane-4-methanol | 5.0 | | | | | | | 5.0 | 42.0 |
| 2,2-diethyl-1,3-dioxolane-4-methanol | | 5.0 | | | | | | | |
| 2,2-dimethyl-1,3-dioxolane-4-ethanol | | | 5.0 | | | | | | |
| 2,2,4-trimethyl-1,3-dioxolane | | | | | | | | | |
| Glycerin | 20.0 | 20.0 | 20.0 | 20.0 | 20.0 | 20.0 | 20.0 | 20.0 | 10.0 |
| Acetylenol E100 | 0.5 | 0.5 | 0.5 | 0.5 | 0.5 | 0.5 | 0.5 | 0.5 | 0.5 |
| Ion-exchanged water | 48.0 | 48.0 | 48.0 | 48.2 | 48.2 | 48.2 | 48.2 | 48.2 | 2.8 |
| Content R of resin particle (%) | 2.5 | 2.5 | 2.5 | 2.5 | 2.5 | 2.5 | 2.5 | 2.5 | 6.0 |
| Content S of specific organic solvent (%) | 0.0 | 0.0 | 0.0 | 5.0 | 5.0 | 5.0 | 5.0 | 5.0 | 42.0 |
| Value of S/R (times) | 0.0 | 0.0 | 0.0 | 2.0 | 2.0 | 2.0 | 2.0 | 2.0 | 7.0 |
| Content of water (%) | 69.0 | 69.0 | 69.0 | 69.0 | 69.0 | 69.0 | 69.0 | 69.0 | 37.2 |

<Evaluation>

The following evaluation was performed by using the inks obtained as described above. In the present invention, "A" and "B" are acceptable levels and "C" is an unacceptable level in the evaluation criteria of each item described below. The evaluation results are described in Table 5.

(Abrasion Resistance)

Each of the prepared inks was filled into an ink cartridge and the ink cartridge was set in an ink jet recording apparatus (trade name "PIXUS iP3100" manufactured by Canon Inc.) that ejects the ink from a recording head by using an effect of thermal energy. In these examples, a recording duty of a solid image recorded under a condition in which one ink drop of about 5 ng per drop was applied to a unit area of $1/1,200$ inches×$1/1,200$ inches was defined as 100%. A solid image (recording duty of 100%) of 200 mm×200 mm was recorded on a recording medium (coated paper, trade name "LX gloss coat 157" manufactured by Sakurai Co., Ltd.) by using the aforementioned ink jet recording apparatus. This recording medium is a low-absorptivity recording medium in which an amount of water absorbed in 30 $msec^{1/2}$ from contact start is 10 $mL/m^2$ or less in Bristow method. The recorded solid image was left to stand for one day and abrasion test was performed under a condition of 10 times of reciprocation at load of 500 g by using a taber abrasion tester (trade name "abrasion resistance tester" manufactured by Imoto Machinery Co., Ltd.) that can perform measurement according to JIS L 0849. The image after the abrasion test was visually checked and the abrasion resistance of the image was evaluated based on the evaluation criteria described below.

A: No scratch was on the image.

B: Some scratches were on the image but the recording medium was not visible.

C: Some scratches were on the image and the recording medium was visible.

(Ejection Stability)

Each of the prepared inks was filled into an ink cartridge and the ink cartridge was set in an ink jet recording apparatus (trade name "iB4030" manufactured by Canon Inc.) that ejects the ink from a recording head by using an effect of thermal energy. In these examples, a recording duty of a solid image recorded under a condition in which one ink drop of about 22 ng per drop was applied to a unit area of $1/600$ inches×$1/600$ inches was defined as 100%. A cycle in which one page of solid image with a recording duty of 5% was recorded on an entire surface of an A4-size recording medium (normal paper, trade name "PB PAPER" manufactured by Canon Inc.) and then the recording was stopped for 240 seconds was repeated in an environment in which the temperature was 30° C. and the relative humidity was 10%. This cycle was repeated until the total number of recorded pages reached 800 and 1,000. After the recording of 800 solid images and 1,000 solid images, vertical ruled lines were recorded on the recording medium. The recorded vertical ruled lines were visually checked and the ejection stability of the ink was evaluated based on the evaluation criteria described below.

AA: The vertical ruled lines of the 1,000th page were not disturbed.

A: The vertical ruled lines of the 800th page were not disturbed and, although the vertical ruled lines of the 1,000th page were distributed, they were continuous.

B: Although the vertical ruled lines of both of the 800th page and the 1,000th page were disturbed, they were continuous.

C: The vertical ruled lines of the 1,000th page were disturbed and were partially absent.

TABLE 5

| | | Evaluation Results | |
|---|---|---|---|
| | | Abrasion resistance | Ejection stability |
| Example | 1 | A | AA |
| | 2 | A | AA |
| | 3 | A | AA |
| | 4 | A | AA |
| | 5 | A | AA |
| | 6 | B | AA |
| | 7 | B | AA |
| | 8 | B | AA |
| | 9 | A | AA |
| | 10 | A | AA |
| | 11 | A | AA |
| | 12 | A | AA |
| | 13 | B | AA |
| | 14 | A | AA |
| | 15 | B | AA |
| | 16 | A | AA |
| | 17 | A | AA |
| | 18 | B | AA |
| | 19 | B | AA |
| | 20 | A | AA |
| | 21 | A | AA |
| | 22 | A | A |
| | 23 | A | A |
| | 24 | A | B |
| | 25 | B | AA |
| | 26 | A | AA |
| | 27 | A | AA |
| | 28 | A | AA |
| | 29 | A | A |
| | 30 | A | A |
| | 31 | A | B |
| | 32 | A | AA |
| | 33 | A | AA |
| | 34 | A | AA |
| | 35 | A | AA |
| | 36 | A | AA |
| | 37 | B | AA |
| | 38 | B | AA |
| | 39 | B | AA |
| | 40 | A | AA |
| | 41 | B | AA |
| | 42 | A | AA |
| | 43 | B | AA |
| | 44 | A | AA |
| | 45 | A | AA |
| | 46 | A | AA |
| | 47 | B | AA |
| | 48 | B | AA |
| | 49 | A | AA |
| | 50 | A | AA |
| | 51 | A | A |
| | 52 | A | A |
| | 53 | A | B |
| | 54 | B | AA |
| | 55 | A | AA |
| | 56 | A | AA |
| | 57 | A | AA |
| | 58 | A | A |
| | 59 | A | A |
| | 60 | A | B |

TABLE 5-continued

| | | Evaluation Results | |
|---|---|---|---|
| | | Abrasion resistance | Ejection stability |
| Comparative Example | 1 | C | AA |
| | 2 | C | AA |
| | 3 | C | AA |
| | 4 | C | AA |
| | 5 | C | AA |
| | 6 | C | AA |
| | 7 | C | AA |
| | 8 | C | AA |
| | 9 | C | AA |
| | 10 | C | AA |
| | 11 | C | B |
| | 12 | C | B |
| | 13 | C | B |
| | 14 | C | AA |
| | 15 | C | AA |
| | 16 | C | AA |
| | 17 | C | AA |
| | 18 | C | AA |
| | 19 | A | C |

The present invention can provide an aqueous ink that has excellent ejection stability and that can be used to record an image with excellent abrasion resistance. Moreover, the present invention can provide an ink cartridge and an ink jet recording method using this aqueous ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-071263, filed Apr. 20, 2021, Japanese Patent Application No. 2021-071264, filed Apr. 20, 2021, Japanese Patent Application No. 2021-071265, filed Apr. 20, 2021, and Japanese Patent Application No. 2022-045793, filed Mar. 22, 2022, which are hereby incorporated by reference herein in their entirety.

What is claimed is:

1. An aqueous ink for ink jet comprising a pigment, a resin particle and an organic solvent, wherein
   the resin particle is a first resin particle formed of a polyester resin, and
   the organic solvent is at least one selected from the group consisting of a compound represented by a general formula (1), a compound represented by a general formula (2) and a compound represented by a general formula (3),

(1)

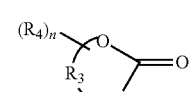

(2)

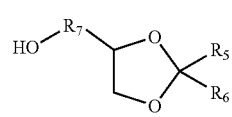

(3)

wherein in the general formula (1), $R_1$ and $R_2$ each independently represent a linear or branched alkyl group with one to six carbon atoms; in the general formula (2), $R_3$ represents an ethylene group or a propylene group, $R_4$ represents a methyl group or an ethyl group, n represents 0 or 1 and n is 1 when $R_3$ is the ethylene group; and in the general formula (3), $R_5$ and $R_6$ each independently represent a linear or branched alkyl group with one to four carbon atoms and $R_7$ represents an alkylene group with one to four carbon atoms.

2. The aqueous ink according to claim 1, wherein a glass-transition temperature of the first resin particle is 50° C. or more.

3. An aqueous ink for ink jet comprising a pigment, a resin particle and an organic solvent, wherein
the resin particle is a second resin particle formed of a urethane resin, and
the organic solvent is at least one selected from the group consisting of a compound represented by a general formula (1) and a compound represented by a general formula (2),

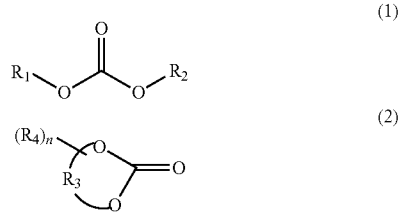

wherein in the general formula (1), $R_1$ and $R_2$ each independently represent a linear or branched alkyl group with one to six carbon atoms; in the general formula (2), $R_3$ represents an ethylene group or a propylene group, $R_4$ represents a methyl group or an ethyl group, n represents 0 or 1 and n is 1 when $R_3$ is the ethylene group.

4. The aqueous ink according to claim 3, wherein glass-transition temperature of the second resin particle is −40° C. or more.

5. The aqueous ink according to claim 1, wherein a volume-based cumulative 50% particle size of the resin particle is 30 nm or more to 300 nm or less.

6. The aqueous ink according to claim 3, wherein a volume-based cumulative 50% particle size of the resin particle is 30 nm or more to 300 nm or less.

7. The aqueous ink according to claim 1, wherein a content (% by mass) of the resin particle is 0.5% by mass or more to 10.0% by mass or less based on a total mass of the ink.

8. The aqueous ink according to claim 3, wherein a content (% by mass) of the resin particle is 0.5% by mass or more to 10.0% by mass or less based on a total mass of the ink.

9. The aqueous ink according to claim 1, wherein a content (% by mass) of the resin particle is 0.5% by mass or more to 5.0% by mass or less based on a total mass of the ink.

10. The aqueous ink according to claim 3, wherein a content (% by mass) of the resin particle is 0.5% by mass or more to 5.0% by mass or less based on a total mass of the ink.

11. The aqueous ink according to claim 1, wherein a mass ratio of a content (% by mass) of the organic solvent to a content (% by mass) of the resin is 0.1 times or more to 10.0 times or less.

12. The aqueous ink according to claim 3, wherein a mass ratio of a content (% by mass) of the organic solvent to a content (% by mass) of the resin particle is 0.1 times or more to 10.0 times or less.

13. The aqueous ink according to claim 1, wherein a mass ratio of a content (% by mass) of the organic solvent to a content (% by mass) of the resin particle is 0.1 times or more to 5.0 times or less.

14. The aqueous ink according to claim 3, wherein a mass ratio of a content (% by mass) of the organic solvent a content (% by mass) of the resin particle is 0.1 times or more to 5.0 times or less.

15. An ink cartridge comprising an ink and an ink storage portion configured to store the ink, wherein the ink comprises the aqueous ink according to claim 1.

16. An ink cartridge comprising an ink and an ink storage portion configured to store the ink, wherein the ink comprises the aqueous ink according to claim 3.

17. An ink jet recording method of recording an image on a recording medium by ejecting an ink from an ink jet recording head, wherein the ink comprises the aqueous ink according to claim 1.

18. An ink jet recording method of recording an image on a recording medium by ejecting an ink from an ink jet recording head, wherein the ink comprises the aqueous ink according to claim 3.

19. The aqueous ink according to claim 1, wherein a mass ratio of a content (% by mass) of the organic solvent to a content (% by mass) of the resin particle is 2.0 times or more to 10.0 times or less.

20. The aqueous ink according to claim 3, wherein a mass ratio of a content (% by mass) of the organic solvent to a content (% by mass) of the resin particle is 2.0 times or more to 10.0 times or less.

21. The aqueous ink according to claim 1, wherein the organic solvent is at least one selected from the group consisting of ethyl methyl carbonate, butylene carbonate, 2,2-dimethyl-1,3-dioxolane-4-methanol, 2,2-diethyl-1,3-dioxolane-4-methanol, and 2,2-dimethyl-1,3-dioxolane-4-ethanol.

22. The aqueous ink according to claim 3, wherein the organic solvent is at least one selected from the group consisting of ethyl methyl carbonate and butylene carbonate.

* * * * *